United States Patent
Jow

(10) Patent No.: US 10,412,196 B2
(45) Date of Patent: Sep. 10, 2019

(54) MAPLESS USER INTERFACES FOR LIMITED NETWORK CONDITIONS

(71) Applicant: Uber Technologies, Inc., San Francisco, CA (US)

(72) Inventor: Bryant Jow, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 279 days.

(21) Appl. No.: 15/468,040

(22) Filed: Mar. 23, 2017

(65) Prior Publication Data

US 2018/0278722 A1   Sep. 27, 2018

(51) Int. Cl.
*H04L 29/08*   (2006.01)
*G01C 21/34*   (2006.01)
*G06F 3/0484*  (2013.01)
*G01C 21/36*   (2006.01)

(52) U.S. Cl.
CPC .............. *H04L 67/36* (2013.01); *G01C 21/34* (2013.01); *G01C 21/3697* (2013.01); *G06F 3/0484* (2013.01); *H04L 67/1036* (2013.01)

(58) Field of Classification Search
CPC ... G06F 3/048; H04L 67/18; G06Q 50/30–34; G01C 21/3667–3676; G08G 21/202
See application file for complete search history.

(56) References Cited

U.S. PATENT DOCUMENTS

| | | | |
|---|---|---|---|
| 2010/0123737 A1* | 5/2010 | Williamson | G01C 21/3647 345/672 |
| 2014/0040808 A1* | 2/2014 | Kim | G06F 3/04817 715/771 |
| 2016/0123761 A1* | 5/2016 | Van Wieringen | G01C 21/3697 701/465 |
| 2016/0223355 A1* | 8/2016 | Habib | G01C 21/3492 |
| 2017/0074659 A1* | 3/2017 | Giurgiu | G01S 19/41 |
| 2018/0067620 A1* | 3/2018 | Adler | G06F 3/0482 |

* cited by examiner

*Primary Examiner* — Jennifer N To
*Assistant Examiner* — Liang Y Li
(74) *Attorney, Agent, or Firm* — Fenwick & West LLP

(57) ABSTRACT

A client device provides mapless user interfaces to show a service provider's progress in movement toward a start location. One type of mapless interface is a grid interface, which the device selects if the device is subject to low network connectivity. The grid interface includes graphics representing the start location and the service provider. The two graphics are displayed at their respective location coordinates on a coordinate grid. Because the grid interface does not include a map, it can be loaded relatively quickly even when the service requestor device is experiencing low network connectivity.

20 Claims, 9 Drawing Sheets

MAPLESS USER INTERFACES FOR LIMITED NETWORK CONDITIONS

TECHNICAL FIELD

This disclosure relates generally to user interfaces for network computing systems and more particularly to selecting a user interface based on network connectivity strength and location error.

BACKGROUND

Passenger transportation systems move people from a current location to a desired location. With the development of the Internet and availability of mobile devices, tablets, and other web-enabled devices, new ways of arranging transportation have emerged. There are now several services that allow passengers to book transport online using an application or webpage, and increased Internet connectivity provides easier propagation of information between passengers, drivers, and network services. However, reliable Internet connectivity is not readily available under all circumstances, and attempting to load a service's standard user interface over an unreliable Internet connection may lead to a negative user experience.

SUMMARY

According to examples herein, a client device selects a user interface (or display mode) based on the strength of a network connection between the device and a network. The client device determines a start location (e.g., a pick-up address, a pick-up coordinate, etc.) for a service (e.g., a transport service or a trip, or a delivery service, etc.) for the user, and receives location information of a service provider from a network computing system. The client device also determines a connectivity strength between the client device and a communications network. If the connectivity strength is below a threshold, then the client device operates in a different mode, such as by displaying an alternative user interface (e.g., a grid user interface) instead of a default user interface (e.g., a full map-based user interface). The alternative user interface includes graphics representing the relative locations of service provider and the start location (or current location of the user or client device).

DESCRIPTION

Overview

Figure 1:
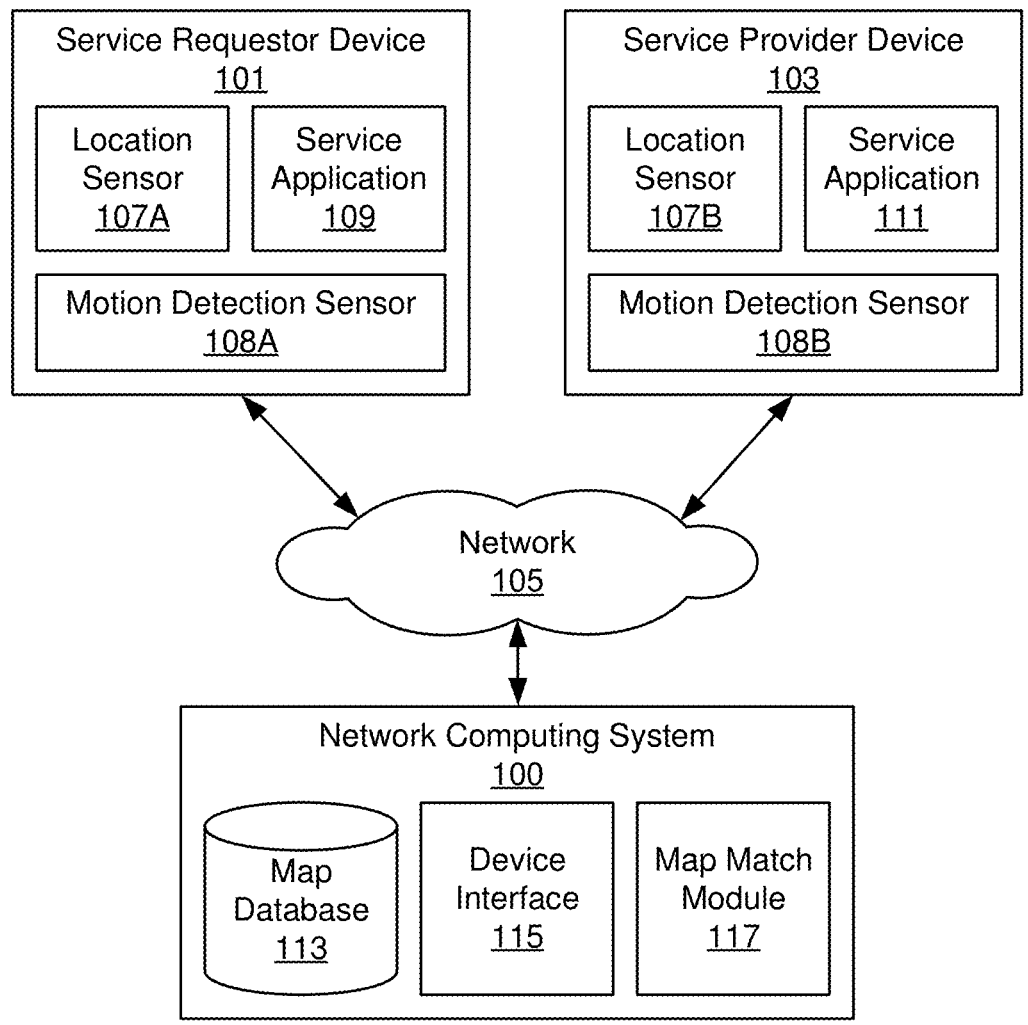
FIG. 1 illustrates a system environment for a network computing system, according to one embodiment.

A network computing system, such as a service coordination system, provides an network service that arranges services between parties. For example, one of the services that can be arranged by the system is a transport service (or a "trip"), which allows a user (e.g., a service requestor) to request a trip from a start location (e.g., a pick-up location) to an end location (e.g., a destination location). To request a service, in one example, the service requestor uses his or her client device (referred to herein as the "service requestor device") to send a service request to the system. The service request contains data specifying, among other things, the start and end locations. The system matches the service request to a service provider (e.g., selects a service provider to provide the requested service for the service requestor) and sends an invitation message to the service provider device (which the service provider can accept or decline), and the service provider can begin traveling to the start location (e.g., by driving a vehicle to the start location).

As the service provider travels to the start location of the service requestor, the service requestor device can receive location information of the service provider from the network computing system (which can correspond to the current location and/or movement of travel of the service provider). Such information can be valuable for the service requestor to visualize where the service provider is or what route the service provider is taking to reach the start location. The service requestor device provides an interface with a graphic that represents the location of the service provider relative to the service requestor or relative to the start location. In one example, a default user interface, such as one that is displayed by the client application when the service requestor device has normal (or default, or standard) connectivity or high connectivity, can correspond to a map-based user interface that includes a map and graphics representing the start location and the current (or previous) location of the service provider. The service requestor device can periodically update the map interface or the graphic(s) to show the updated location of the service provider (e.g., once the service provider is assigned to provide the service for the service requestor). This enables the service requestor to monitor the service provider's travel toward the start location, which can convey a sense of the time remaining before the service provider arrives at start location.

One drawback to providing this kind of map interface on the service requestor device is that loading and/or displaying the map involves transferring a relatively large amount of data to the device. In situations where the service requestor device has unreliable network connectivity (e.g., low bandwidth, patchy network service, etc.), the amount of data transfer that takes place when loading the map can make the user interface slow and sluggish, which leads to a poor user experience.

Instead of displaying the map interface regardless of whether the service requestor device has a reliable network connection, according to examples herein, the service requestor device (or client application) can determine that the device is experiencing low network connectivity and in response, operate in an alternative mode, such that an alternative user interface is displayed on the service requestor device (as opposed to the default user interface).

For example, the device measures its network connectivity, and if network strength or network bandwidth is below a threshold amount or measurement, then the device displays a mapless user interface instead of the map user interface. According to an example, one of the mapless user interfaces provided by the service requestor device is a grid interface. The grid interface includes graphics representing the start location (and/or the current location of the service requestor device) and the service provider. The two graphics are displayed at their respective location coordinates on a coordinate grid. The service requestor device can also periodically update the grid interface to update the location of the service provider as the service provider travels toward the pickup location. As a result, the grid interface similarly allows the service requestor to view or monitor the service provider travel toward the start location and also conveys a sense of the time remaining before the service provider arrives at the start location. Because the grid interface does not include a map, it can be loaded more quickly than the default map-based user interface, and can provide a good user experience for the service requestor despite the service requestor device experiencing low network connectivity.

As an addition or an alternative, the service requestor device may provide a second mapless user interface, referred to as a timeline interface. In one example, the service requestor device can select the timeline interface (as opposed to the first mapless user interface, such as the grid interface) if the location error value for the service provider's coordinates is higher than a threshold error value. The timeline interface includes the graphics representing the service provider and the start location (or current location of the service requestor device), but instead of being displayed on a grid of location coordinates, the two graphics are displayed along a line. The distance between the two graphics can represent the time (or alternatively, the distance) remaining before the service provider arrives at the start location. For example, the distance decreases (e.g., the two graphics move closer together) as the service provider travels toward the start location. The timeline interface can be advantageous, for example, when the location error value for the service provider's coordinates is high enough that the service provider's location cannot be determined with sufficiently high confidence to display it on the grid interface.

System Environment

FIG. 1 illustrates a system environment for a network computing system 100, such as a service coordination or arrangement system, according to one embodiment. In particular, FIG. 1 illustrates a detailed view of modules within a network computing system 100, a service requestor device 101, and a service provider device 103, according to one embodiment. Some embodiments of the network computing system 100, the service requestor device 101, and the service provider device 103 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the network computing system 100 implements a network service, such as an arrangement service, which enables services to be arranged between parties such as between the users of the service requestor device 101 and the service provider device 103. As described herein, a service provider device 103 can correspond to a mobile computing device, such as a smartphone, that is operated by a service provider, such as a driver of a vehicle, or can correspond to an on-board computing system of a vehicle. The network computing system 100 can correspond to a set of servers, in some examples, and can operate with or as part of another system that implements network services. An example of the services includes arranging a transport service or a delivery service between a service requestor and a service provider. In the context of the discussion herein, an operator of a vehicle (e.g., the service provider) provides the service of transporting a person (e.g., the service requestor) from a pick-up location (e.g., the start location) to a destination (e.g., the end location) requested by the person. In one embodiment, vehicles include private vehicles, such as cars and motorcycles, as well as public transportation vehicles such as trains, light rail, buses, etc. In one embodiment, the transportation of a person from a pick-up location to a destination location is referred to as a trip.

The network computing system 100 receives (e.g., periodically) geographic information from a service provider device 103 included in a vehicle as the vehicle moves its position. The geographic information includes geographic points that describe a trip of the vehicle. In one embodiment, the geographic information is global positioning system (GPS) information.

As shown in FIG. 1, the network computing system 100 is in communication with the service requestor device 101 and the service provider device 103 via a network(s) 105. In one embodiment, the network 105 is the Internet or any combination of a LAN, a MAN, a WAN, a mobile, wired or wireless network, a private network, or a virtual private network. While only a service requestor device 101 and a single service provider device 103 are shown in FIG. 1, any number of these devices 101, 103 can be in communication with the network computing system 100 at a given time.

In one embodiment, the service requestor device 101 is an electronic device (e.g., a mobile device) of a person that requested a service. The service requestor device 101 is used by the person to request a service from a starting location to an ending location via a service application 109 included in the service requestor device 101. The service application 109 allows the user of the service requestor device 101 to submit a service request, which the network computing system 100 then processes in order to select an operator of a transportation vehicle.

According to examples, the service request may include (i) a user identifier (ID), (ii) a start location (e.g., a location specified by the user or the current location of the service requestor device 101 as determined by a location sensor 107A included in the service requestor device 101), (iii) an end location, and/or (iv) a vehicle type. For example, the location sensor 107A uses a GPS receiver (or a receiver for some other global navigation satellite system, such as GLONASS) included in the service requestor device 101 to determine the position of the service requestor device 101 at various instances in time. In one embodiment, the current position of the service requestor device 101 is represented by a location coordinates such as latitude and longitude coordinates. The current position of the service requestor device 101 is also associated with a time stamp indicating the time and the date in which the location sensor 107A measured the current position of the service requestor device 101. Alternatively, the start location of the service requestor device 101 may be manually entered into the service requestor device 101 by the user of the device 101, such as by selecting a location on a map or in the form of an address including at least a street number and street name.

The network service, which is implemented by the network computing system 100 and/or other servers or systems, can receive the service request over the network 105 and can match a service provider to the service request. In one example, the network service performs a matching process in which it (i) identifies a pool of service providers that are available to provide the requested service and satisfy one or more conditions (e.g., have the specified vehicle type, and/or are within a predetermined distance or estimated travel time away from the start location), (ii) selects a service provider from the pool of service providers, and (iii) transmits an invitation to the service provider device 103 of the service provider. The invitation can include the start location, so that the selected service provider can navigate to the start location for initiating the trip for the requestor. In one embodiment, the service provider device 103 is configured to automatically accept an invitation upon receipt. In another embodiment, the service provider device 103 provides the service provider an option to accept or decline the invitation by providing user input. If the invitation is accepted, either automatically or in response to user input, the network computing system 100 can notify the service requestor device 101 accordingly. If the invitation is not accepted (e.g., in response to user input from the service provider), the network service can select a second service provider from the pool of service providers and transmit a second invitation to the service provider device 103 of the second service provider.

In one embodiment, the service provider device 103 is an electronic device located within the vehicle used to provide the service. For example, the service provider device 103 may be a smart phone in the vehicle. As another example, the service provider device 103 may a computing system integrated into the vehicle. The service provider device 103 includes a service application 111. The service application 111 displays, on the service provider device 103, information about a service that the service provider has agreed to provide, such as the start location, navigation, and/or mapping information instructing the service provider to travel to the start location. As referred to herein, the start location may be the current location of the service requestor device 101 or a location specified by the user of the service requestor device 101. The service application 111 may also display, on the service provider device 103, the end location for the assigned service if provided by the user of the service requestor application 111.

The service provider device 103 includes a location sensor 107B. The location sensor 107B uses a GPS receiver (or a receiver for some other global navigation satellite system, such as GLONASS) included in the service provider device 103 to identify location data of the vehicle as the vehicle moves along one or more roads to travel to a start location after accepting a service request and to complete a trip. The location data of the vehicle is representative of the vehicle's position at different instances in time while providing a service. For example, at time T1, the service provider device 103 can be at a particular location, identified by location coordinates (e.g., latitude and longitude coordinates) and a time stamp indicative of the time and date when the service provider device 103 measured its current position. If the vehicle is moving, at time T2 the service provider device 103 can be at a different location. In this manner, the service provider device 103 periodically measures the current position of the vehicle (e.g., every three seconds, every four seconds, etc.) and periodically provides location data that is representative of the position of the vehicle over time to the network computing system 100. Alternatively, the service provider device 103 may provide location data whenever new or updated measurements of the current location of the vehicle are taken or are available.

The location module 107B may also provide an error value for the location data. In one embodiment, the error value is a distance interval that has a 95% confidence interval. In other words, the error value indicates with 95% certainty that the distance between the location indicated by the coordinates and the true location of the service provider device 103 (and thus the vehicle) is less than the distance interval. For example, if the error value includes a distance interval of 5 meters, then the error value indicates with 95% certainty that the true location of the service provider device 103 is within 5 meters of the location indicated by the location coordinates. In other embodiments, the confidence interval has a different value (e.g., 99.7%, 68%).

The service requestor device 101 and the service provider device 103 also include motion detection sensors 108A, 108B (collectively referred to as motion detection sensors 108). The motion detection sensors 108 use one or more sensors to detect translational and rotational motion of the service requestor device 101 or the service provider device. For example, the motion detection modules 108 contain an accelerometer and a gyroscope. The motion detection sensors 108 may further include a compass for detecting the orientation of the corresponding device 101, 103 relative to one or more compass directions.

Each of the service applications 109 and 111 respectively stored at the service requestor device 101 and the service provider device 103 can include or use an application programming interface (API) to communicate data with the network computing system 100. The API can provide access to the network computing system 100 via secure access channels over the network 105 through any number of methods, such as web based forms, programmatic access via RESTful APIs, Simple Object Access Protocol (SOAP), remote procedure call (RPC), scripting access, etc., while also providing secure access methods including key-based access to ensure the network computing system 100 remains secure and only authorized users, service providers, and/or third parties can gain access to the network computing system 100

As shown in FIG. 1, the network computing system 100 comprises a map database 113. The map database 113 stores a variety of map spatial databases. In other embodiments, the map database 113 is implemented as a separate system (e.g., separate from the network computing system 100) and is in communication with the network computing system 100, the service requestor device 101, and/or the service provider device 103 over the network 105. The map database 113 is one or more databases identifying different points (e.g., having a latitude and longitude, and/or an altitude) along paths of trips that a given vehicle can use, and information about how the different points connect with other points. Some commercially available map databases include points identifying locations of interests or landmarks.

With respect to vehicles, a vehicle map database can include points corresponding to locations on known road networks such as roadways, highways, freeways, etc. The vehicle map database may also include other information related to road networks, such as intersections, one way streets, how the different roads and streets connect to each other, etc. Similarly, with respect to airplanes, an airplane map system spatial database can include points corresponding to locations along flight paths and what points are boundaries for no flight zones, while for trains, a train's map system spatial database can include points corresponding to locations on railroads and railways, and where/how the railroads connect. Additional map databases can be created or modified in the map database 113 as a result of updates and changes to corresponding map information.

The device interface 115 manages communications between the network computing system 100, and the service requestor device 101 and the service provider device 103 over the network 105. The device interface 115 receives service requests from the service requestor device 101 and transmits invitations to the service provider device 103. In addition, the device interface 115 receives acceptances from the service provider device 103 and routes notifications of the acceptances to the service requestor device 101. In one embodiment, the device interface 115 receives location data and/or state information about the service provider or service application 111 from the service provider device 103 as the vehicle moves to complete a service and forwards the location data to a map match module 117 included in the network computing system 100.

While some examples described herein describe the service provider device 103 as providing location data while providing a service, in other examples, the location tracking devices 101 can also provide the location data to the network computing system 100 while the service provider is on-duty and/or available to receive invitations for service or on route to the start location of a requestor, but not yet providing a service. In such examples, the map match module 117 can determine the map matched path of travel of the location tracking devices 101 in order to illustrate the positions and/or movements of the vehicles as graphic icons moving on roadways or freeways on a map user interface (e.g., map tiles). Such map user interfaces can be displayed by the service applications 111 to enable requestors to see where the vehicles are in their general geographic area or with respect to their current or start locations.

Mapless User Interfaces

Figure 2:
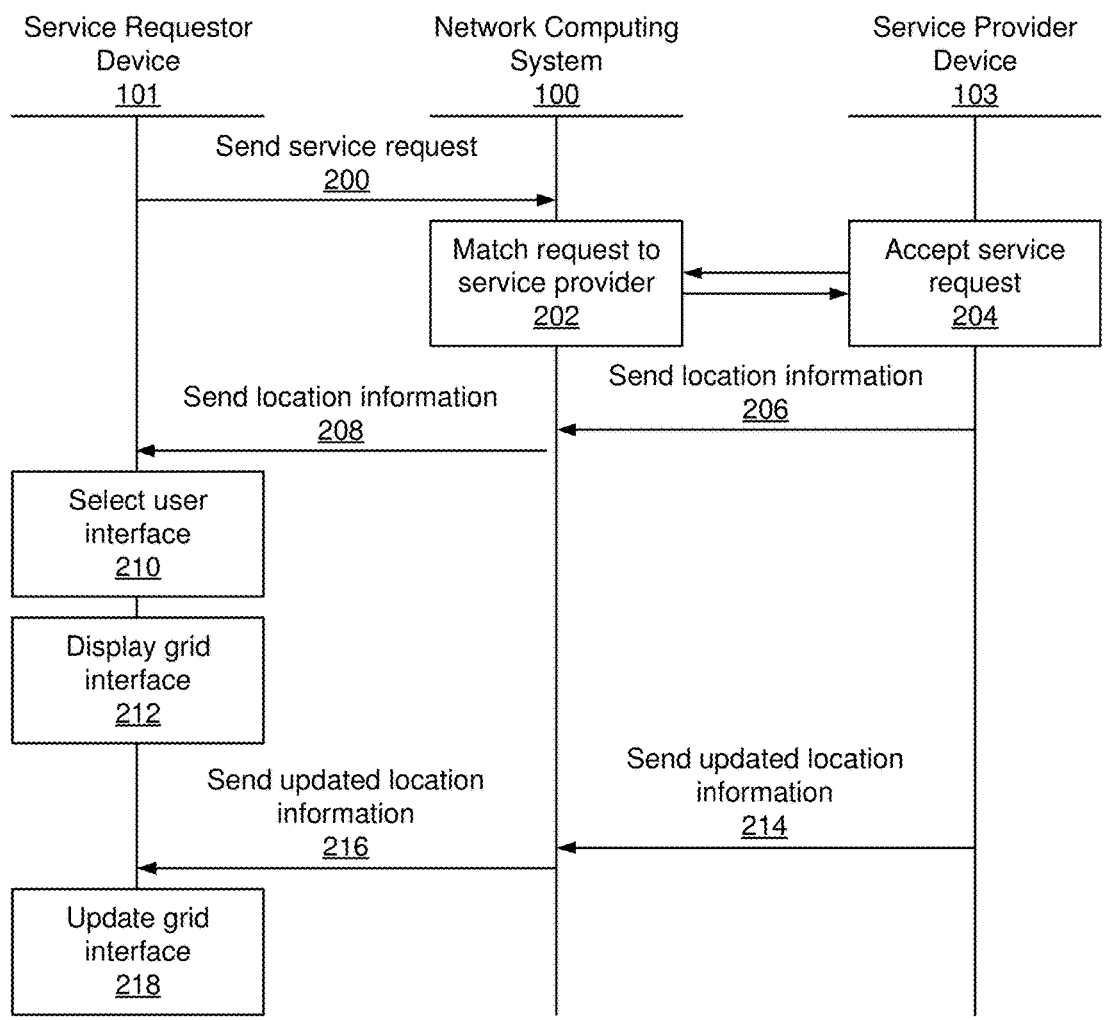
FIG. 2 is an interaction diagram illustrating a process for providing a mapless user interface for a network computing system, according to one embodiment.

FIG. 2 is an interaction diagram illustrating a method for providing mapless user interfaces for the network computing system, according to one embodiment. In other embodiments, the method may include additional, fewer, or different steps, and the steps shown in FIG. 2 may be performed in a different order.

The service requestor device 101 sends 200 a service request to the network computing system 100. For example, a user of the service requestor device 101 interacts with the service application 109 to provide user input to request a service, and the service application 109 generates and sends the service request in response to the user input. The service request includes start coordinates (e.g., latitude and longitude coordinates) identifying the service's start location. The start location can be the current location of the service requestor device 101 (e.g., as determined by the location sensor 107A). Alternatively, the start location can be a location specified by the user (e.g., as part of the user input provided to request the trip). The location specified by the user can be different from the user's current location.

The network computing system 100 receives the service request, matches 202 the service request to a service provider, and the service provider device 103 can accept 204 the service request. After the service provider device 103 has accepted the service request 204, the service provider device 103 sends 206 location information about the device 103 (and, by extension, the transportation vehicle) to the network computing system 100, and the network computing system 100 sends 208 the location information to the service requestor device 101. In another embodiment, the service provider device 103 sends the location information directly to the service requestor device 101. As referred to herein, location information specifies service provider coordinates for the current location of the service provider device 103 as well as an error value for the service provider coordinates.

After receiving the location information, the service requestor device 101 uses the location information and information about the current network connectivity of the service requestor device 101 to select 210 a user interface to display to the service requestor while the vehicle travels to the start location. In one embodiment, the service requestor device 101 can select between different user interfaces, such as: (1) a map interface that displays the location of the vehicle and the start location on a map; (2) a grid interface that displays a representation of the location of the vehicle and the start location on a grid rather than a map; and/or (3) a timeline interface that displays a representation of the time remaining before the vehicle arrives at the start location. The grid interface and the timeline interface may be referred to collectively as mapless interfaces because both interfaces do not include a map. For the remaining steps 212 through 218, it is assumed that the service requestor device 101 selected 210 the grid interface. In other examples, the service requestor device 101 can select a different interface according to various implementations. An example process of selecting 210 a user interface (which describes circumstances under which the map interface, the grid interface, and the timeline interface may be selected) is provided below with reference to FIG. 4, and examples of the map interface and the timeline interface are shown in FIGS. 5A and 5B, respectively.

Figure 3A:
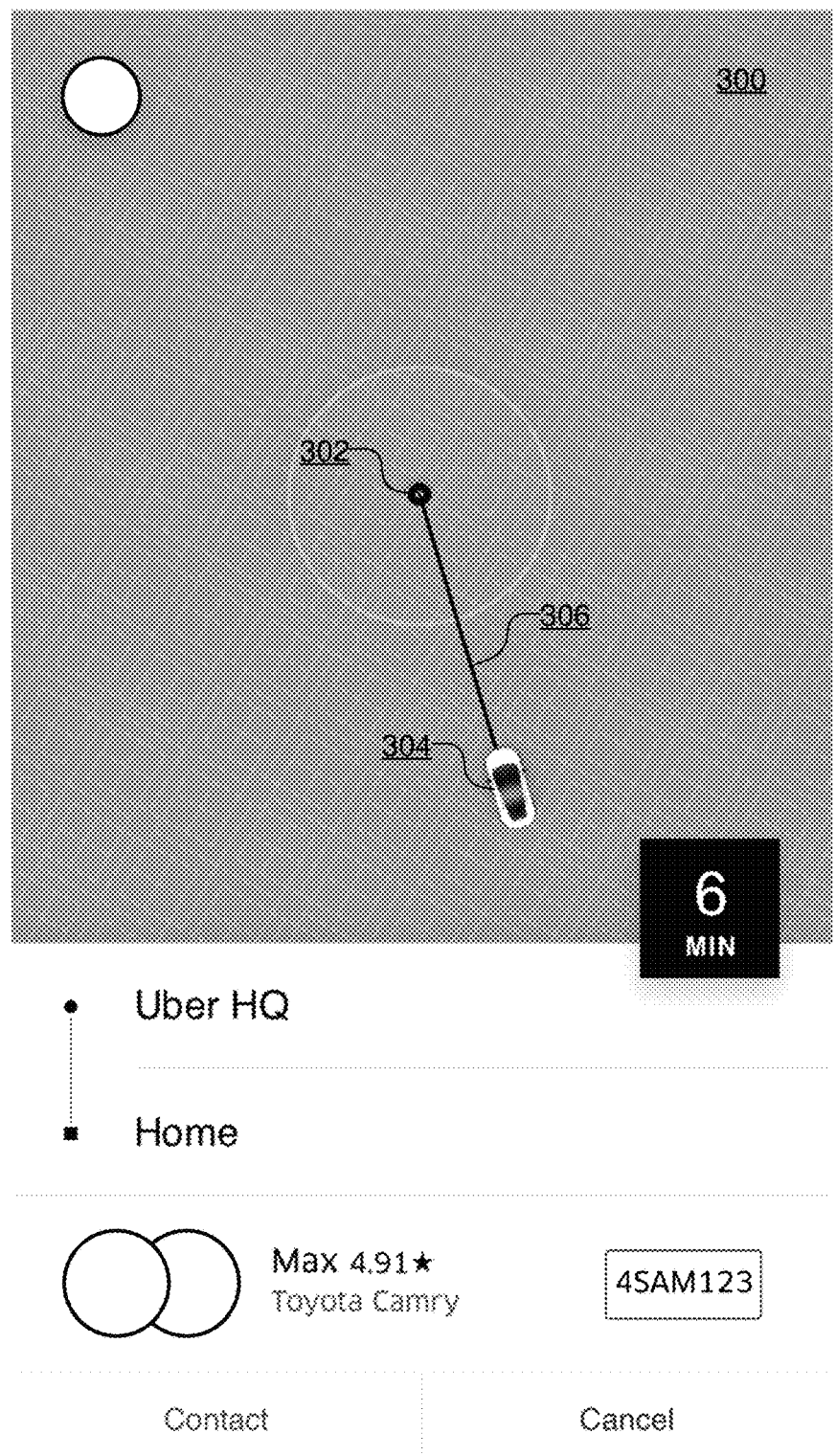
FIGS. 3A and 3B illustrate examples of a grid interface for a network computing system, according to one embodiment.

The service requestor device 101 generates and displays 212 the grid interface to the service requestor. Referring now to FIG. 3A, an example of the grid interface is illustrated. The grid interface displays the relative positions of the start location and the vehicle's location without displaying either location on a map. The absence of a map in the grid interface is especially advantageous in situations where the service requestor device 101 is experiencing relatively poor network connectivity because retrieving a map (e.g., from the map database 113 of the network computing system 100 or from a third-party mapping system) involves transferring a relatively large amount of data. The grid interface updates as the vehicle travels closer to the start location, so the interface can still convey to the user of the service requestor device 101, in a graphical manner, that the vehicle is approaching the start location and in which direction the vehicle is approaching the start location.

The grid interface includes a grid pattern 300 that represents a grid of location coordinates. The grid includes two perpendicular axes that define a coordinate system for location coordinates of the geographic area surrounding the start location and the location of the transportation vehicle. In other words, a first axis represents the north-south direction, a second axis represents the east-west direction, and each point on the grid represents a location (e.g., a set of latitude and longitude coordinates). The grid pattern 300 is displayed in the grid interface as a graphic with a repeating geometric pattern. In one embodiment, the grid pattern 300 is simply a first set of lines parallel to the first axis and a second set of lines parallel to the second axis. Alternatively, the grid pattern 300 has a more elaborate design that represents two sets of parallel lines. For instance, in the embodiment shown in FIG. 3, the grid pattern 300 includes a repeating pattern of squares and L-shaped six-sided polygons, where each edge in the pattern is parallel to one of the two axes.

In one embodiment, the grid pattern 300 is oriented so that the axis representing the north-south direction is vertical (e.g., parallel to the left and right sides of the display of the service requestor device 101) and the axis representing the east-west direction is horizontal (e.g., parallel to the top and bottom sides of the display of the service requestor device 101). In another embodiment, the grid pattern 300 is oriented so that the axes are aligned with real-world compass directions. In other words, the axis representing the north-south direction is aligned with the real-world north-south compass direction and/or the axis representing the east-west direction is aligned in the real-world east-west compass direction. In this embodiment, the orientation of the grid pattern 300 can be determined based on data from a compass of the service requestor device 101 (e.g., so that the north-south parallel lines correspond to the north-south direction in the real world). For instance, the service requestor device 101 determines, based on data from the compass, the orientation of the service requestor device 101 relative to a compass direction (e.g., the compass is a magnetic compass that provides data about the orientation of the client device relative to the north-south direction of Earth's magnetic field). After determining the orientation of the device 101, the service requestor device 101 modifies the rotational orientation of the grid pattern 300 so that the axis representing the north-south direction is aligned with the real-world north-south compass direction. As described below with reference to FIG. 5, the service requestor device 101 can also rotate the grid pattern 300 upon detecting that the service requestor device 101 has been rotated.

The grid interface also includes graphics representing the start location (the "start location graphic 302") and the current location of the service provider (the "service provider graphic 304") that are displayed on the grid. In the illustrated embodiment, the start location graphic 302 is a dot and the service provider graphic 304 is a car (e.g., to represent a vehicle). The start location graphic 302 is displayed on the grid at a point defined by the start coordinates, and the service provider graphic 304 is displayed on the grid at a point defined by the service provider coordinates, which represent the current location of the service provider. The grid interface may further include an elongated graphic 306 extending from the start location graphic 302 to the service provider graphic 304. In the example shown in FIG. 3A, the elongated graphic 306 is a solid line segment, but the elongated graphic 306 may alternatively be a dotted line or an arrow.

If the start location is different from the service requestor's current location (e.g., if the service requestor manually entered the start location into the service requestor device 101 or a start location was selected that differs from the current location), then the grid interface may further include a service requestor graphic. For instance, the service requestor device 101 may determine service requestor coordinates representing the current location of the service requestor (e.g., via the location sensor 107A) and display the service requestor graphic at a position on the grid pattern corresponding to the service requestor coordinates.

Referring back to FIG. 2, the service provider device 103 occasionally sends 214 updated location information (e.g., updated service coordinates and an updated confidence measure) to the network computing system 100, which in turn sends 216 the updated location information to the service requestor device 101. Alternatively, the service provider device 103 can send the updated location information directly to the service requestor device 101. In one embodiment, the service provider device 103 sends the updated location information at fixed time intervals (e.g., every 10 seconds).

Upon receiving the updated location information, the service requestor device 101 updates 218 the grid user interface to display the new location of the service provider. In particular, the service requestor device 101 moves the service provider graphic 304 from its previous grid position to a grid position defined by the updated service provider coordinates (the "updated grid position"). In one embodiment, the service requestor device 101 "moves" the service provider graphic 304 by removing the graphic 304 from its previous grid location, displaying an animation moving the graphic 304 in translation from the previous grid location to the updated grid position, and then displaying the graphic 304 at the updated grid position. The service requestor device 101 may also regenerate the elongated graphic 306 so that it connects the service provider graphic 304 at the updated grid position to the start location graphic 302.

Figure 3B:
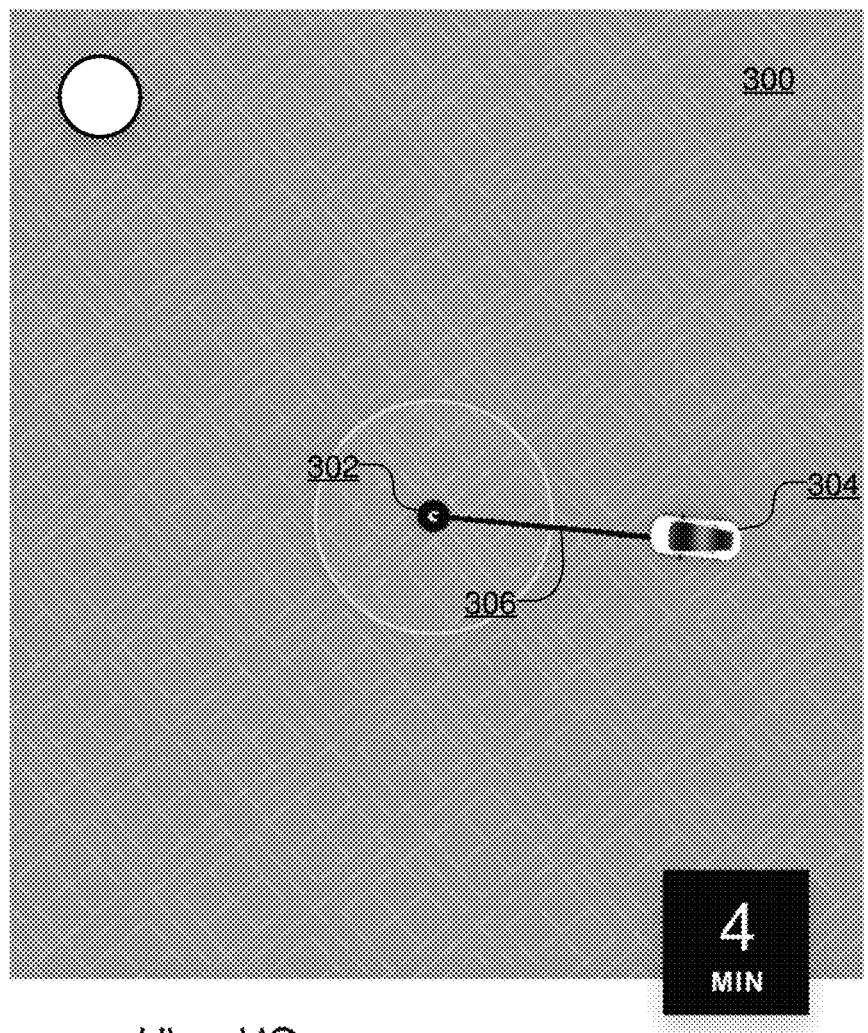

Referring now to FIG. 3B, an example of an updated grid interface is shown. As shown in FIG. 3B, the updated grid interface can include a smaller portion of the grid (e.g., the grid interface can "zoom in" on the grid pattern 300) if the updated grid position of the vehicle graphic is closer to the grid position of the start location graphic 302. In other words, the grid pattern 300 in the updated grid interface is enlarged relative to the grid pattern 300 in the previous interface.

If the service requestor device 101 detects a rotation (e.g., a change in bearing direction or position) of the service requestor device 101 while displaying the grid interface (e.g., through information provided by the gyroscope and/or compass of the motion detection sensor 108A), the service requestor device 101 can rotate the grid pattern 300 to maintain the alignment between the north-south (and/or east-west) axis of the grid with the real-world north-south (and/or east-west) compass direction. For example, the service requestor can be holding and viewing the service requestor device 101 in front of her while facing north on a street corner, and then subsequently turn right while holding and viewing the service requestor device 101. In FIG. 3B, an example is shown of the grid interface after the service requestor device 101 detects that the device 101 has been rotated approximately 60 degrees clockwise (as compared to FIG. 3A), which results in the grid pattern 300 being rotated 60 degrees counterclockwise. Because the position of the service provider graphic 304 is defined as a point on the grid, rotating the grid pattern 100 causes the position of the service provider graphic 304 to move in rotation within the grid user interface about the center of the grid pattern 100. For the same reason, the elongated graphic 306 also rotates within the grid interface. Because the start location graphic 302 is displayed at the center of the grid pattern 100 in the example shown in FIGS. 3A and 3B, the position of the start location graphic 302 does not move within the grid user interface; however, in embodiments where the start location graphic 302 is displayed at a position other than the center of the grid pattern (e.g., the center of the grid pattern may be defined as the midpoint of the elongated graphic 306), then the position of the start location graphic 302 may also rotate within the grid interface.

Although the step of selecting 210 the user interface is shown in FIG. 2 as occurring on the service requestor device 101, the user interface 210 may alternatively be selected on the network computing system 100. For example, the network computing system 100 may receive the location information from the service provider device 103 and determine the network connectivity of the service requestor device 101, and then use the location information and the network connectivity to select 210 the user interface. The network computing system 100 may then send 208 the location information to the service requestor device 101 with an instruction to display the selected user interface.

User Interface Selection

Figure 4:
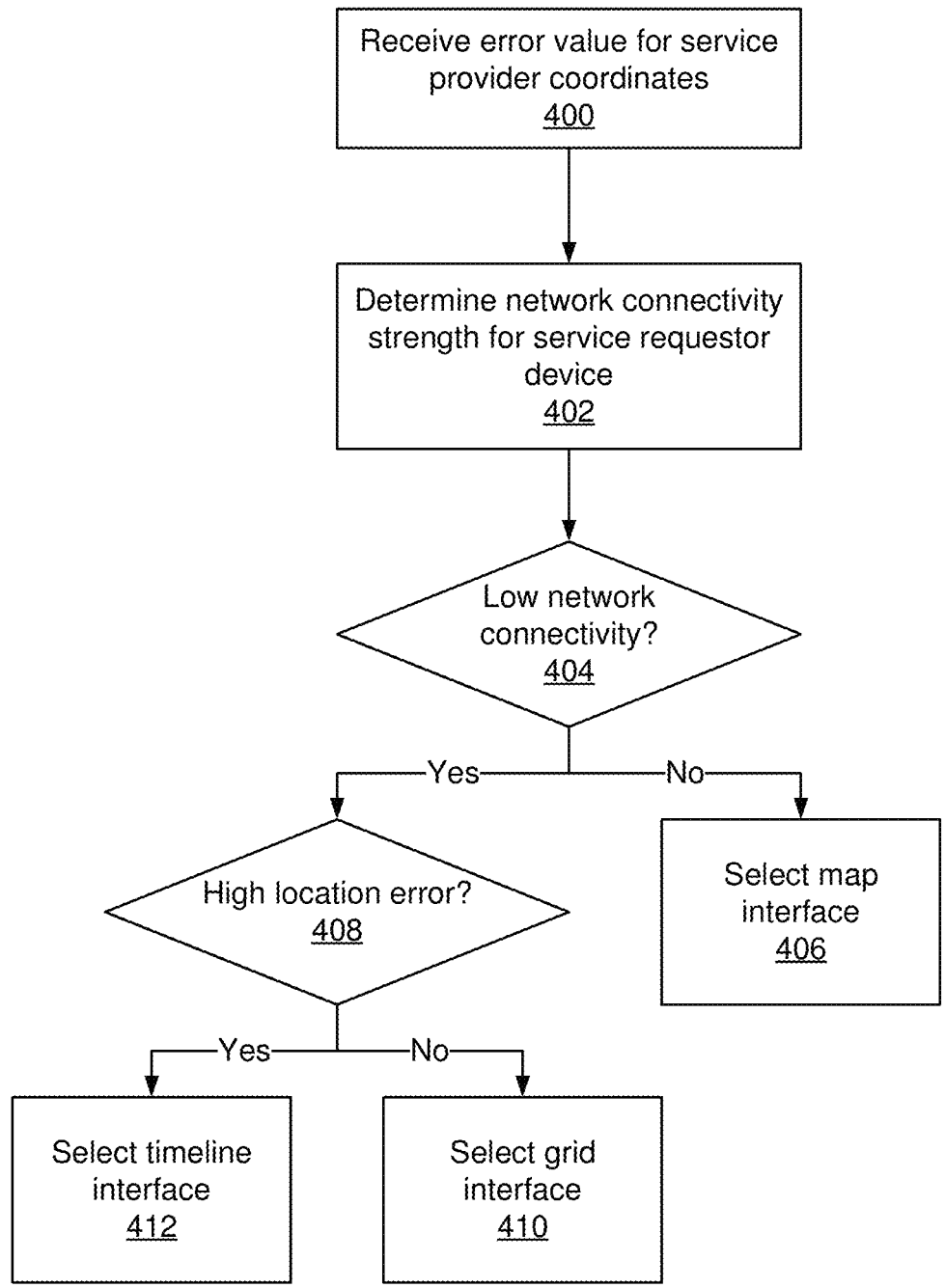
FIG. 4 is a flow chart illustrating a process for selecting a mapless user interface for a network computing system, according to one embodiment.
Figure 5A:
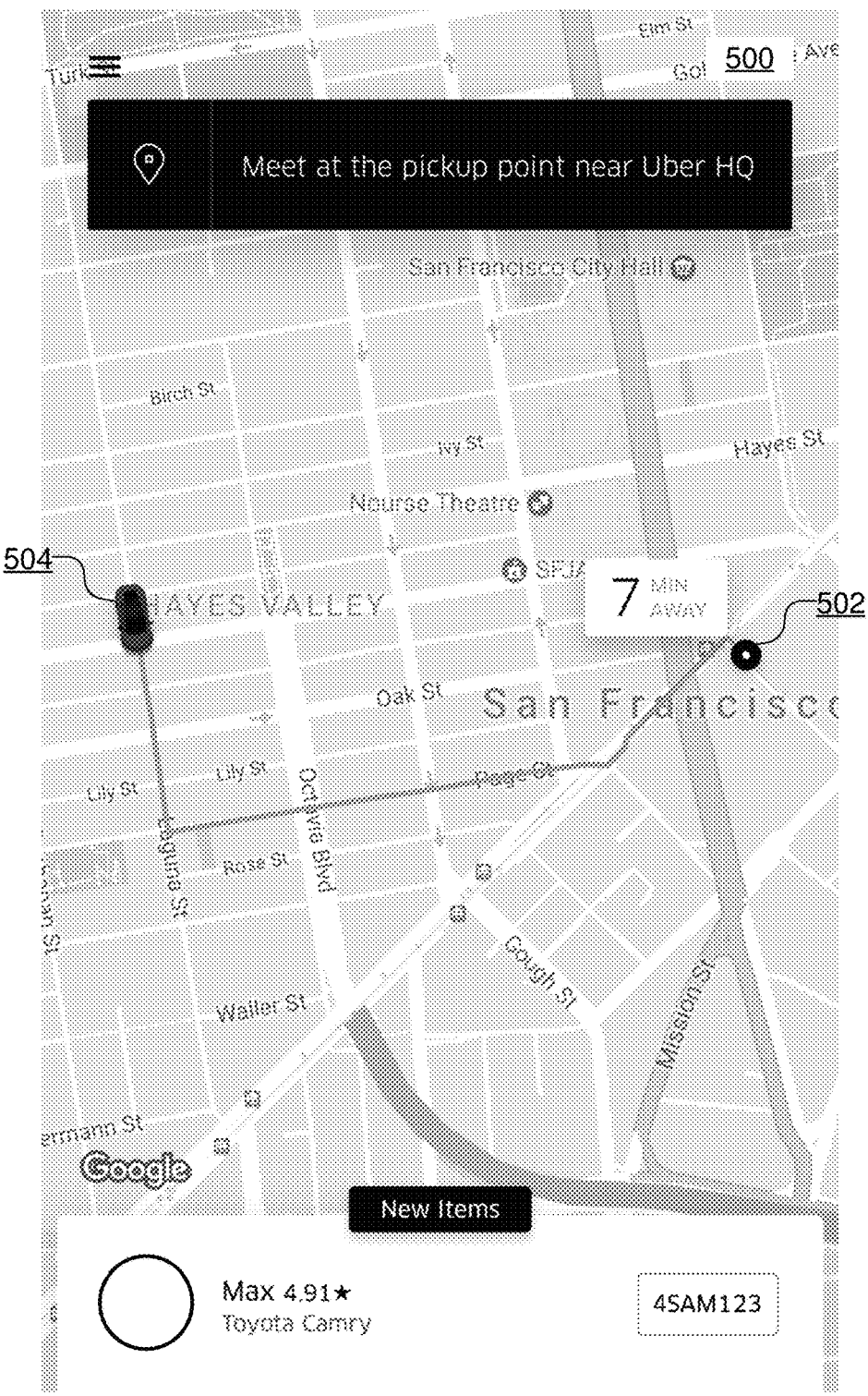
FIG. 5A illustrates an example of a map interface for a network computing system, according to one embodiment.
Figure 5B:
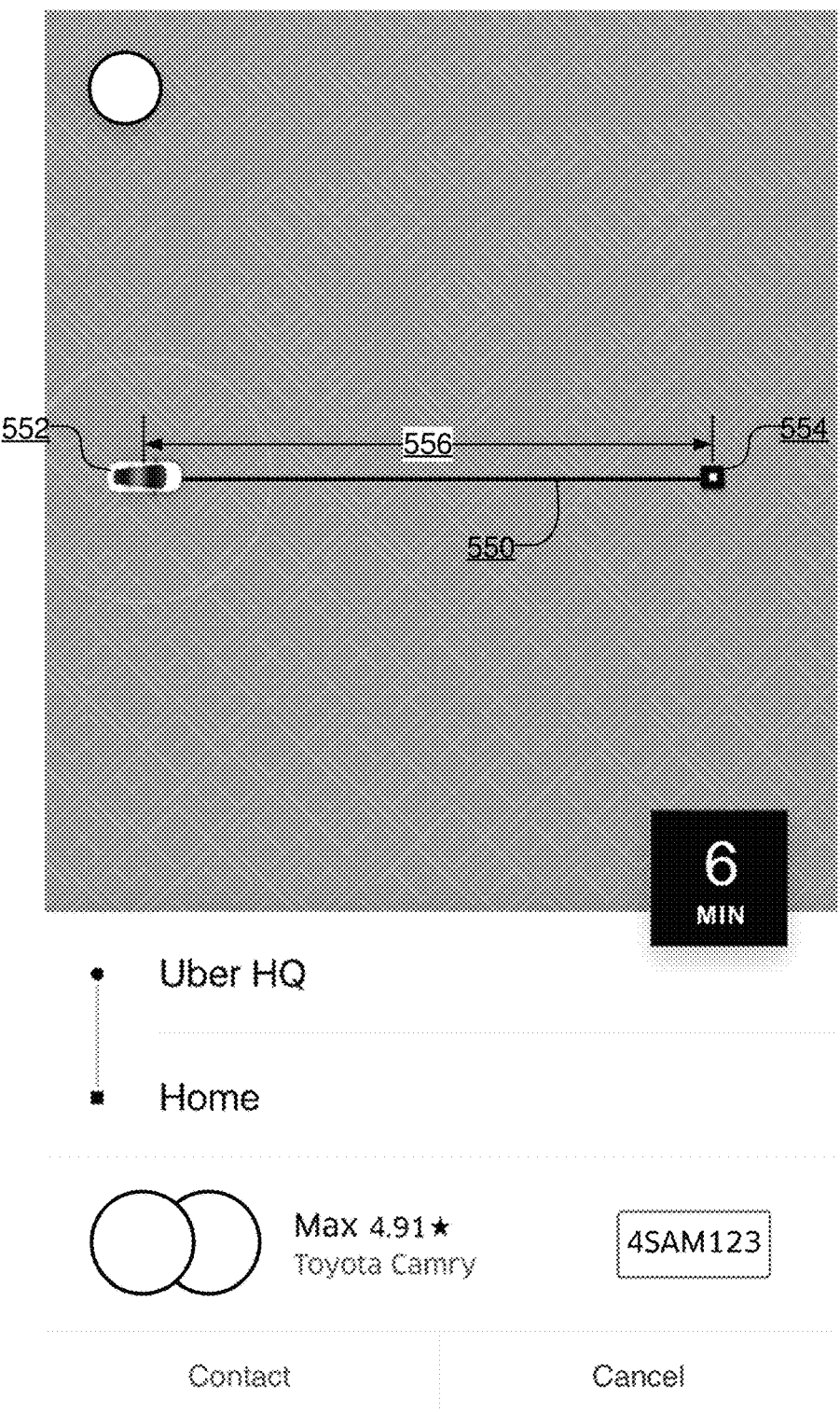
FIG. 5B illustrates an example of a timeline interface for a network computing system, according to one embodiment.

FIG. 4 is a flow chart illustrating a method for selecting a user interface to be displayed on the service requestor device 101. Although this method is described below as being executed on the service requestor device 101, some or all of the method may alternatively be executed on the network computing system 100.

As described above with reference to FIG. 2, the service requestor device 101 receives 400 a location error value for the service provider coordinates (e.g., as part of the location information sent by the service provider device 103, which specifies both service provider coordinates and a location error value).

The service requestor device 101 determines 402 its network connectivity strength. As referred to herein, network connectivity strength is a measure of the quality of the connection between the service requestor device 101 and the network 105. For example, if the service requestor device 101 is connected to the network 105 via a cellular data connection (e.g., 3G, 4G, or LTE), then the network connectivity strength may vary based on weather conditions, the presence of interference from other signals, whether the service requestor device 101 is indoors, outdoors, or underground, and the distance between the service requestor device 101 and the cellular tower to which it is connected. In various embodiments, the service requestor device 101 determines 402 its network connectivity strength by performing one of (or a combination of) the following processes to generate a numerical value representing the network connectivity strength: measuring the latency between the service requestor device 101 and the network computing system 100 (e.g., the time taken to ping the network computing system 100); measuring the latency between the service requestor device 101 and some other system that is connected to the network 105; determining a signal strength of the cellular data connection of the device 101; and/or determining a number of times during a predefined time interval that the device 101 loses and reestablishes its connection to the network 105 (e.g., a measure of how patchy the network connection is).

The service requestor device 101 determines 404 whether its network connectivity strength is too low for the map interface. For example, if the network connectivity strength is represented by a numerical value, the service requestor device 101 determines that the network connectivity strength is too low if the numerical value is below a threshold value and not too low if the numerical value is above the threshold value. In other embodiments, the steps of determining 402 the network connectivity strength and determining 404 whether the network connectivity strength is too low are performed together. For instance, the service requestor device 101 may determine that the network connectivity strength is too low when the service requestor device 101 is connected to the network 105 via a slower communication protocol (e.g., 3G) regardless of latency, signal strength, or any other numerical value. As referred to herein, the service requestor device 101 experiences normal connectivity (alternatively referred to as default connectivity, standard connectivity, or high connectivity) when its network connectivity strength is not too low according to the determination made in this step 404. Similarly, the service requestor device 101 experiences low connectivity when its network connectivity is too low according to the determination made in this step 404.

If the service requestor device 101 determines 404 that its network connectivity strength is not too low, the service requestor device 101 selects 406 a map interface for display to the user, and the service requestor device 101 proceeds to request map data (e.g., from the map database 113 of the network computing system 100 or from a third-party system) to display as part of the map interface.

FIG. 5A illustrates an example of a map interface. The map interface includes a map 500 of the geographic region that contains the start location and the service provider's current location and further includes graphics representing the start location 502 and the service provider 504. The service provider graphic 504 is displayed at a position on the map 500 corresponding to the service provider coordinates, and the start location 502 is displayed at a position on the map 500 corresponding to the start coordinates.

Referring back to FIG. 4, if the service requestor device 101 determines 404 that its network connectivity strength is too low (e.g., the network connectivity strength is below a threshold), then the service requestor device 101 determines 408 whether the location error value is too high (e.g., the location error value is above a threshold). As described above, a location error value may include a distance interval subject to a 95% confidence interval (or some other confidence interval). In this case, the service requestor device determines 408 whether the error value is too high by comparing the error value to an error threshold. If the error value is above the error threshold, then the error value is deemed to be too high, and if the error value is below the threshold, then the error value is deemed not to be too high.

If the service requestor device 101 determines 408 that the error value is not too high, then the service requestor device 101 selects 410 the grid interface. Thus, the grid interface is selected when (1) the service requestor device 101 has network connectivity that is not strong enough to rapidly retrieve map data and (2) the service provider device 103 is able to report its location with sufficiently low error (e.g., sufficiently high confidence).

If the service requestor device 101 determines 408 that the error value is too low, then the service requestor device 101 selects 412 the timeline interface. Thus, the timeline interface is selected when (1) the service requestor device 101 has network connectivity that is not strong enough to rapidly retrieve map data and/or (2) the service provider device 103 is not able to report its location with sufficiently low error.

FIG. 5B illustrates an example of a timeline interface. The timeline interface includes an elongated graphic 550, a service provider graphic 552, and a start location graphic 554. Initially, the service provider graphic 552 and the start location graphic 554 are displayed at opposite ends of the elongated graphic 550. The distance 556 between the service provider graphic 552 and the start location graphic 554 represents the amount of time remaining before the service provider arrives at the start location (e.g., the vehicle's ETA). Thus, the initial distance 556 (shown in FIG. 6) represents the vehicle's ETA at the time the service provider is matched to the service requestor's trip request. As the transportation vehicle travels toward the start location, the transportation vehicle's ETA decreases, and the distance 556 decreases by a proportional amount. In some embodiments, the start location graphic 554 remains anchored to one end of the elongated graphic 550. Thus, decreasing the distance 556 causes the service provider graphic 552 to move in translation across the timeline interface toward the start location graphic 554, which creates the perception of the service provider traveling toward the start location.

In other embodiments, the method shown in FIG. 4 may include additional, fewer, or different steps, and the steps shown in FIG. 4 can be performed in a different order. In one embodiment, the service requestor device 101 can determine 408 whether the error value is too high before determining 404 whether the network connectivity is too low. In this embodiment, the service requestor device 101 selects 412 the timeline interface if the error value is too high, and the service requestor device 101 proceeds to determine 404 whether the network connectivity is too low. If the network connectivity is too low, then the service requestor device 101 selects 410 the grid interface; otherwise, the service requestor device 101 selects 406 the map interface.

In another embodiment, the service requestor device 101 determines 404 whether its network connectivity is too low but does not compare the error value of the service provider coordinates to the error threshold. In this embodiment, the service requestor device 101 selects 410 the grid interface if its network connectivity is too low; otherwise, the service requestor device 101 selects 406 the map interface.

In some embodiments, portions of the user interface selection method shown in FIG. 4 may be performed again when the service requestor device 101 receives 400 updated location information specifying an updated location error value. In these embodiments, the service requestor device 101 may switch to a different user interface if the updated location error value crosses the error threshold. For example, if the previous location error value was lower than the error threshold but the updated location error value is higher than the error threshold, then the service requestor device 101 may switch from the grid interface to the timeline interface. As another example, if the previous location error value was higher than the error threshold but the updated location error value is lower than the error threshold, then the service requestor device 101 may switch from the timeline interface to the grid interface.

Similarly, portions of the user interface selection method shown in FIG. 4 may also be performed again when the service requestor device 101 determines that its network connectivity strength has changed. In one embodiment, the service requestor device 101 may determine 402 an updated network connectivity strength at fixed intervals (e.g., every 60 seconds) and perform the rest of the method if the updated network connectivity strength differs from the previous network connectivity strength by more than a threshold value. For example, if the previous network connectivity strength was too low but the updated network connectivity strength is not too low, then the service requestor device 101 may switch from one of the mapless interfaces (e.g., the grid interface or the timeline interface) to the map interface. Meanwhile, if the previous network connectivity strength was not too low but the updated network connectivity strength is too low, then the service requestor device 101 may switch from the map interface to one of the mapless interfaces.

In the embodiment shown in FIGS. 2 and 4, the steps 402, 404 of determining the network connectivity strength of the service requestor device and determining whether the service requestor device 101 has low network connectivity are illustrated as part of the method of selecting 210 the user interface, which takes place after service requestor device 101 sends 200 to the network computing system 100. In other embodiments, one or both of these steps 402, 404 can be performed at a different time in the method shown in FIG. 2. For example, one or both of these steps 402, 404 can be performed at the beginning of the method shown in FIG. 2 (e.g., before the service request is sent 200), can be periodically performed at different times during the method shown in FIG. 2, or can be performed concurrently with one or more other steps shown in FIG. 2.

Although the methods and user interfaces provided above are discussed with reference to a service provider traveling toward a start location, these methods may applied in other contexts. For example, these methods may also be applied to select a user interface to display on the service requestor device 101 after the service requestor has been picked up by the service provider and has begun traveling toward the end location specified in the trip request. These methods may also be applied outside the context of a network computing system. For example, these methods may be applied to select a user interface on a computing device in any situation where the computing system is displaying a user interface to illustrate a moving object traveling toward a location.

Hardware Components

Figure 6:
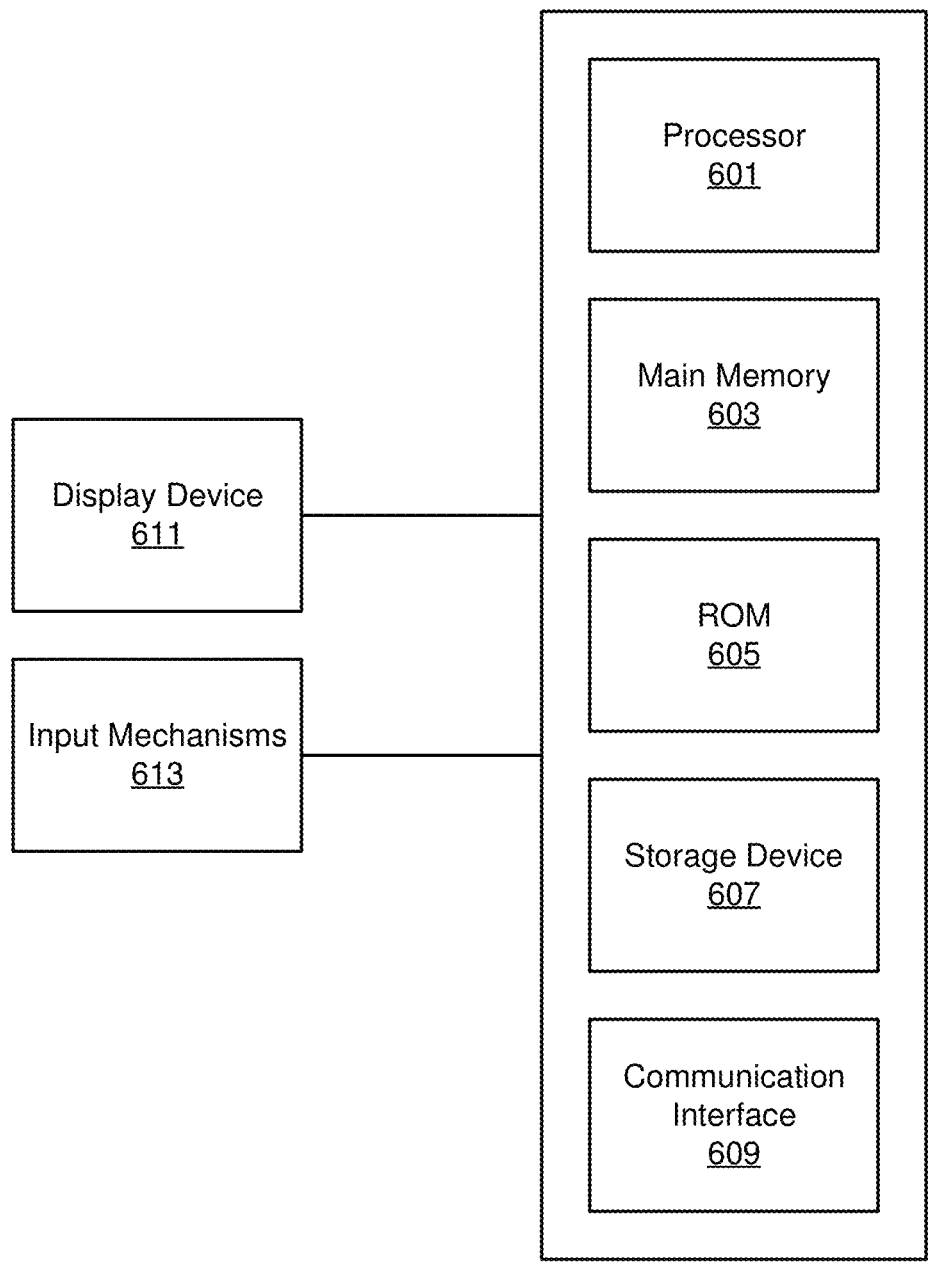
FIG. 6 illustrates an example computing system for implementing the network computing system, according to one embodiment.

FIG. 6 is a diagram illustrating example computing system, according to one embodiment. For example, in the context of FIG. 1, the network computing system 100 may be implemented using the computing system shown in FIG. 6. The network computing system 100 may also be implemented using a combination of multiple computing systems as described by FIG. 6.

In one implementation, the network computing system 100 includes processing resources 601, main memory 603, read only memory (ROM) 605, storage device 607, and a communication interface 609. The network computing system 100 includes at least one processor 601 for processing information and a main memory 603, such as a random access memory (RAM) or other dynamic storage device, for storing information and instructions to be executed by the processor 601. Main memory 603 also may be used for storing temporary variables or other intermediate information during execution of instructions to be executed by processor 601. The network computing system 100 may also include ROM 605 or other static storage device for storing static information and instructions for processor 601. The storage device 607, such as a magnetic disk or optical disk, is provided for storing information and instructions.

The communication interface 609 can enable the network computing system 100 to communicate with one or more networks (e.g., cellular network) through use of the network link (wireless or wireline). Using the network link, the map server 600 can communicate with one or more computing devices, and one or more servers. In some variations, the network computing system 100 can be configured to receive sensor data (e.g., such as location data) from one or more location tracking devices via the network link. The sensor data can be processed by the processor 601 and can be stored in, for example, the storage device 607. The processor 601 can process the sensor data of a location tracking device in order to determine the path of travel of a transportation vehicle corresponding to the location tracking device. Extrapolated position information can be transmitted to one or more service requestor devices over the network 105 to enable the service applications 109 running on the service requestor devices to use the position information to present a visualization of the actual movement of the transportation vehicles.

The network computing system 100 can also include a display device 611, such as a cathode ray tube (CRT), an LCD monitor, or a television set, for example, for displaying graphics and information to a user. An input mechanism 613, such as a keyboard that includes alphanumeric keys and other keys, can be coupled to the network computing system 100 for communicating information and command selections to processor 901. Other non-limiting, illustrative examples of input mechanisms 613 include a mouse, a trackball, touch-sensitive screen, or cursor direction keys for communicating direction information and command selections to processor 601 and for controlling cursor movement on display device 611.

Examples described herein are related to the use of the network computing system 100 for implementing the techniques described herein. According to one embodiment, those techniques are performed by the network computing system 100 in response to processor 601 executing one or more sequences of one or more instructions contained in main memory 603. Such instructions may be read into main memory 603 from another machine-readable medium, such as storage device 607. Execution of the sequences of instructions contained in main memory 603 causes processor 601 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
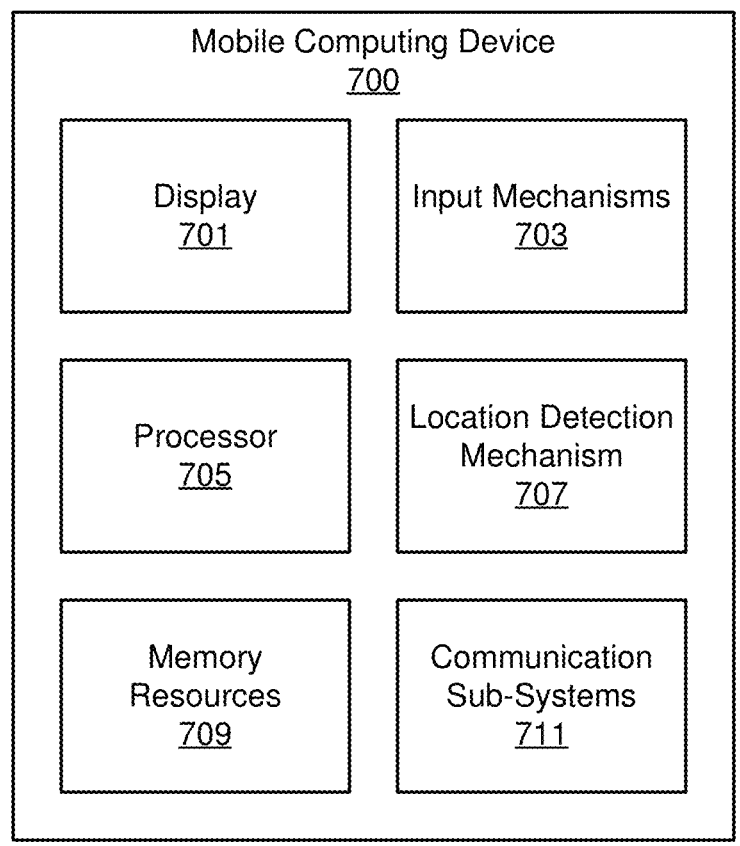
FIG. 7 illustrates an example computing device for implementing the service requestor device and the service provider device, according to one embodiment.

FIG. 7 is a diagram illustrating an example computing device, according to one embodiment. For example, the computing device 700 may correspond to a mobile computing device, such as a cellular device that is capable of telephony, messaging, and data services. The computing device 700 can correspond to each of the service requestor device 101 and the service provider device 103. Examples of such devices include smartphones, handsets or tablet devices for cellular carriers. Computing device 700 includes a processor 705, memory resources 709, a display device 701 (e.g., such as a touch-sensitive display device), one or more communication sub-systems 711 (including wireless communication sub-systems), input mechanisms 703 (e.g., an input mechanism can include or be part of the touch-sensitive display device), and one or more location detection mechanisms (e.g., location module) 707. In one example, at least one of the communication sub-systems 711 sends and receives cellular data over data channels and voice channels.

The processor 705 is configured with software and/or other logic to perform one or more processes, steps and other functions described with implementations, such as those described herein. Processor 705 is configured, with instructions and data stored in the memory resources 709, to operate a service application as described herein. For example, instructions for operating the service application in order to display user interfaces can be stored in the memory resources 709 of the computing device 700.

From the viewpoint of a service provider, a service provider operating a service provider device 103 can operate the service application 111 so that sensor data, such as location/position data, can be determined from the location detection mechanism 707. This location/position data can then be wirelessly transmitted to the system via the communication sub-systems 711. From the viewpoint of an end-user, a user can operate the service application 109 in order to receive position information of one or more transportation vehicles from the system (via the communication sub-systems 711).

The processor 705 can provide content to the display 701 by executing instructions and/or applications that are stored in the memory resources 709. In some examples, one or more user interfaces can be provided by the processor 705, such as a user interface for the service application, based at least in part on the received position information of the one or more transportation vehicles. While FIG. 7 is illustrated for a mobile computing device, one or more embodiments may be implemented on other types of devices, including full-functional computers, such as laptops and desktops (e.g., PC).

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining, at a client device associated with a service requestor, start coordinates for a service requested by the service requestor;
   receiving, at the client device, location information for a service provider specifying service provider coordinates and a location error value for the service provider coordinates;
   determining a connectivity strength between the client device and a communications network;
   determining that the connectivity strength is below a connectivity threshold amount;
   determining whether the location error value is below an error threshold value;
   in response to determining that the connectivity strength is below the connectivity threshold amount and that the location error value is below the error threshold value, generating for display a grid user interface on the client device as opposed to a default user interface, the grid user interface comprising:
      a grid pattern representing a grid of location coordinates,
      a service provider graphic displayed at a position on the grid pattern corresponding to the service provider coordinates, and
      a start location graphic displayed at a position on the grid pattern corresponding to the start coordinates; and
   in response to determining that the connectivity strength is below the connectivity threshold amount and that the location error value is above the error threshold value, generating for display a timeline user interface on the client device as opposed to the grid user interface or the default user interface, the timeline user interface comprising:
      a service provider graphic displayed at a first end of the timeline user interface, and
      a start location graphic displayed at a second end of the timeline user interface.

2. The method of claim 1, wherein the grid user interface further includes a graphic between the service provider graphic and the start location graphic.

3. The method of claim 1, further comprising:
   determining an orientation of the client device relative to a compass direction, wherein the grid pattern has an axis corresponding to the compass direction and is oriented so that the axis is aligned with the compass direction.

4. The method of claim 3, further comprising:
   determining a change in the orientation of the client device relative to the compass direction; and
   responsive to determining the change in the orientation of the client device, rotating the grid pattern so that the axis corresponding to the compass direction is aligned with the compass direction.

5. The method of claim 1, further comprising:
   receiving updated location information for the service provider specifying updated service provider coordinates;
   updating the grid user interface on the client device so that the service provider graphic is displayed at a position on the grid pattern corresponding to the updated service provider coordinates, and the start location graphic is displayed at the position on the grid pattern corresponding to the start coordinates.

6. The method of claim 5, wherein updating the grid user interface includes enlarging the grid pattern.

7. The method of claim 1, the timeline user interface further comprising:
   an elongated graphic,
   the service provider graphic displayed at a first end of the elongated graphic, and
   the start location graphic displayed at a second end of the elongated graphic, wherein a distance between the service provider graphic and the start location graphic represents an amount of time remaining before the service provider arrives at the start location.

8. The method of claim 1, further comprising:
   determining an updated connectivity strength between the client device and the communications network;
   determining that the updated connectivity strength is above the connectivity threshold amount;
   in response to determining that the updated connectivity strength is above the connectivity threshold, displaying a map user interface on the client device as opposed to the grid user interface, the map user interface comprising:
      a map of a geographic region containing the service provider coordinates and the start coordinates;
      a service provider graphic displayed at a position on the map corresponding to the service provider coordinates, and
      a start location graphic displayed at a position on the map corresponding to the start coordinates.

9. The method of claim 1, wherein the start location is a current location of the client device, and wherein determining the start coordinates comprises receiving current coordinates of the client device from a location sensor of the client device.

10. The method of claim 1, wherein the start location is a location remote from a current location of the client device, and wherein determining the start coordinates comprises receiving user input at the client device, the user input specifying the start location.

11. The method of claim 10, further comprising determining, at the client device, service requestor coordinates representing the current location of the client device, wherein the grid user interface further comprises a service requestor graphic displayed at a position on the grid pattern corresponding to the service requestor coordinates.

12. The method of claim 10, further comprising:
   prior to receiving the location information for the service provider, generating a request on the client device based on user input received from the service requestor, the request comprising a request for a service provider to provide a service from the start location to a destination location specified in the request; and
   sending the request to a computing system, wherein the computing system matches the request to the service provider.

13. A non-transitory computer readable medium comprising computer executable instructions encoded thereon that, when executed by a processor causes the processor to perform operations, the instructions comprising instructions to:
   determine, at a client device associated with a service requestor, start coordinates representing a start location for a service requested by the service requestor;

receive, at the client device, location information for a service provider specifying service provider coordinates and a location error value for the service provider coordinates;

determine a connectivity strength between the client device and a communications network;

determine that the connectivity strength is below a threshold connectivity amount;

determine whether the location error value is below an error threshold value;

in response to determining that the connectivity strength is below the connectivity threshold amount and that the location error value is below the error threshold value, generate for display a grid user interface on the client device as opposed to a default user interface, the grid user interface comprising:
- a grid pattern representing a grid of location coordinates,
- a service provider graphic displayed at a position on the grid pattern corresponding to the service provider location coordinates, and
- a start location graphic displayed at a position on the grid patter corresponding to the start location coordinates; and in response to determining that the connectivity strength is below the connectivity threshold amount and that the location error value is above the error threshold value, generate for display a timeline user interface on the client device as opposed to the grid user interface or the default user interface, the timeline user interface comprising:
- a service provider graphic displayed at a first end of the timeline user interface, and
- a start location graphic displayed at a second end of the timeline user interface.

14. The non-transitory computer readable medium of claim 13, wherein the grid user interface further includes a graphic between the service provider graphic and the start location graphic.

15. The non-transitory computer readable medium of claim 13, wherein the instructions further comprise instructions to:

determine an orientation of the client device relative to a compass direction, wherein the grid pattern has an axis corresponding to the compass direction and is oriented so that the axis is aligned with the compass direction.

16. The non-transitory computer readable medium of claim 15, wherein the instructions further comprise instructions to:

determine a change in the orientation of the client device relative to the compass direction; and responsive to determining the change in the orientation of the client device, rotate the grid pattern so that the axis corresponding to the compass direction is aligned with the compass direction.

17. The non-transitory computer readable medium of claim 13, wherein the instructions further comprise instructions to:

receive updated location information for the service provider specifying updated service provider coordinates;

update the grid user interface on the client device so that the service provider graphic is displayed at a position on the grid pattern corresponding to the updated service provider coordinates, and the start location graphic is displayed at the position on the grid pattern corresponding to the start coordinates.

18. The non-transitory computer readable medium of claim 17, wherein updating the grid user interface includes enlarging the grid pattern.

19. The non-transitory computer readable medium of claim 13, wherein the start location is a location remote to a current location of the client device, and wherein determining the start coordinates comprises receiving user input at the client device, the user input specifying the start location.

20. The non-transitory computer readable medium of claim 19, wherein the instructions further comprise instructions to determine, at the client device, service requestor coordinates representing the current location of the service requestor, wherein the grid user interface further comprises a service requestor graphic displayed at a position on the grid pattern corresponding to the service requestor coordinates.

* * * * *